US009875668B2

(12) United States Patent
Song et al.

(10) Patent No.: US 9,875,668 B2
(45) Date of Patent: Jan. 23, 2018

(54) LANGUAGE DELAY TREATMENT SYSTEM AND CONTROL METHOD FOR THE SAME

(71) Applicant: KOREA ADVANCED INSTITUTE OF SCIENCE AND TECHNOLOGY, Daejeon (KR)

(72) Inventors: June Hwa Song, Daejeon (KR); In Seok Hwang, Daejeon (KR); Chung Kuk Yoo, Daejeon (KR); Chan You Hwang, Daejeon (KR); Young Ki Lee, Daejeon (KR); John Dong Jun Kim, Daejeon (KR); Dong Sun Jennifer Yim, Seoul (KR); Chul Hong Min, Daejeon (KR)

(73) Assignee: KOREA ADVANCED INSTITUTE OF SCIENCE & TECHNOLOGY (KAIST), Daejeon (KR)

(*) Notice: Subject to any disclaimer, the term of this patent is extended or adjusted under 35 U.S.C. 154(b) by 141 days.

(21) Appl. No.: 14/047,177

(22) Filed: Oct. 7, 2013

(65) Prior Publication Data

US 2015/0064666 A1 Mar. 5, 2015
US 2017/0301259 A9 Oct. 19, 2017

(30) Foreign Application Priority Data

Sep. 5, 2013 (KR) .................. 10-2013-0106393

(51) Int. Cl.
*G09B 19/04* (2006.01)
*G09B 5/04* (2006.01)
*G10L 25/51* (2013.01)
*G10L 15/00* (2013.01)
*G10L 15/02* (2006.01)
*G09B 5/14* (2006.01)
*G10L 25/78* (2013.01)

(52) U.S. Cl.
CPC ............... *G09B 19/04* (2013.01); *G09B 5/04* (2013.01); *G09B 5/14* (2013.01); *G10L 25/78* (2013.01)

(58) Field of Classification Search
CPC ....................................... G09B 19/04
USPC ......................................... 434/185
See application file for complete search history.

(56) References Cited

U.S. PATENT DOCUMENTS 4,472,833 A * 9/1984 Turrell et al. .................. 381/56
6,628,759 B1 * 9/2003 Cannon ............ H04M 1/72533
379/106.01
7,739,115 B1 * 6/2010 Pettay et al. .................. 704/270
7,818,179 B2 * 10/2010 Krasikov et al. ............. 704/274
8,340,972 B2 * 12/2012 Boillot et al. ................ 704/271

(Continued)

*Primary Examiner* — Sam Yao
*Assistant Examiner* — Alvin Carlos
(74) *Attorney, Agent, or Firm* — Cho-Won IP Consulting; Hyun Ho Song

(57) ABSTRACT

The present disclosures relates to a control terminal, comprising: a data communication unit for receiving a first user voice by data communication with a first audio device and receiving a second user voice by data communication with a second audio device; a turn information generating unit for generating turn information, which is voice unit information, by using the first and second user voices; and a metalanguage processing unit for determining a conversation pattern of the first and second users by using the turn information, and outputting a reminder message corresponding to a reminder event to the first user when the conversation pattern corresponds to a preset reminder event occurrence condition.

21 Claims, 12 Drawing Sheets

(56) References Cited

U.S. PATENT DOCUMENTS

| | | | |
|---|---|---|---|
| 8,712,760 B2* | 4/2014 | Hsia et al. | 704/9 |
| 8,751,943 B1* | 6/2014 | Petrovich | 715/753 |
| 2001/0040590 A1* | 11/2001 | Abbott | G06F 1/163 |
| | | | 715/700 |
| 2002/0133355 A1* | 9/2002 | Ross | G10L 15/1822 |
| | | | 704/275 |
| 2004/0072586 A1* | 4/2004 | Dorenbosch | 455/507 |
| 2004/0122673 A1* | 6/2004 | Park | G10L 15/24 |
| | | | 704/270 |
| 2005/0047394 A1* | 3/2005 | Hodson | H04M 3/51 |
| | | | 370/352 |
| 2007/0004385 A1* | 1/2007 | Horvitz | H04L 12/5855 |
| | | | 455/414.1 |
| 2007/0055514 A1* | 3/2007 | Beattie | G10L 15/26 |
| | | | 704/235 |
| 2007/0071206 A1* | 3/2007 | Gainsboro | H04M 3/2281 |
| | | | 379/168 |
| 2010/0004932 A1* | 1/2010 | Washio | G10L 15/05 |
| | | | 704/255 |
| 2010/0046393 A1* | 2/2010 | Knapp | H04L 41/0609 |
| | | | 370/253 |
| 2012/0156660 A1* | 6/2012 | Kwon et al. | 434/185 |
| 2012/0191454 A1* | 7/2012 | Gabara et al. | 704/246 |
| 2013/0115586 A1* | 5/2013 | Cornally | G09B 7/00 |
| | | | 434/362 |
| 2013/0218553 A1* | 8/2013 | Fujii et al. | 704/9 |
| 2013/0290435 A1* | 10/2013 | Martin | H04L 51/28 |
| | | | 709/206 |
| 2014/0272827 A1* | 9/2014 | Jacobs et al. | 434/185 |
| 2014/0356822 A1* | 12/2014 | Hoque et al. | 434/185 |

* cited by examiner

FIG. 8

| REMINDER NO | REMINDER CONDITIONS |
|---|---|
| R1 | triggered if a parent's turns repeat Ndominance times in which pauses between adjacent turns are shorter than Twait AND no child's turn appears during these parent turns. |
| R2 | triggered if the following condition repeats Ngrace2 times: Given a child's turn, neither a parent's nor a child's turn follows within time duration $T_{neglect}$. |
| R3 | triggered if a parent's turn begins before the child's turn ends for $N_{grace3}$ times. |
| R4 | triggered if the duration of a parent's turn is longer than $T_{long}$ AND no child turn follows within $T_{response4}$ after the parent's turn ends. |
| R5 | triggered if the estimated syllable rate of a parent's turn is higher than $R_{fast}$ AND no child turn follows within $T_{response5}$ after the parent's turn ends. |

FIG. 12

| REMINDER NO | REMINDER MESSAGE |
|---|---|
| R1 | "Please wait for your child to talk back." |
| R2 | "Please respond to your child." |
| R3 | "Please do not interrupt your child." |
| R4 | "Please say it short and simple." |
| R5 | "Please talk more slowly." |

LANGUAGE DELAY TREATMENT SYSTEM AND CONTROL METHOD FOR THE SAME

CROSS-REFERENCE TO RELATED APPLICATION

This application claims priority of Korean Patent Application No. 10-2013-0106393, filed on Sep. 5, 2013, in the KIPO (Korean Intellectual Property Office), the disclosure of which is incorporated herein entirely by reference.

BACKGROUND OF THE INVENTION

Field of the Invention

The present disclosure relates to a language delay treatment system and a control method for the same, and more particularly, to a language delay treatment system configured to analyze a conversation pattern between a parent and a child and correct a conversation habit of the parent, and a control method for the same.

Description of the Related Art

Language delay means a state in which verbal development of an infant is relatively delayed in comparison to physical development.

Unless suitable treatment is timely provided to the language delay symptom, the language delay may act as various latent risk factors over the entirely life of the corresponding infant. For example, learning disability or social skill deficiency in an adolescent period, or even economic hardship or long-term unemployment in an adult age has been reported.

Through studies for more ten years, speech pathologists have proved that very important effects can be provided to infants who are suffering from language delay, when formal treatment provided to the infants under a dedicated therapeutic environment is accompanied with active participation and endeavors of a parent under various conversation situations in daily life.

However, at the conversation in daily life between a parent and a child, the participation of the parent may be more effective when conversation habits of the parent, which have been during the lifetime of the parent, are corrected suitably for the purpose of the treatment. In the speech pathology, correcting conversation habits of a parent as described above is called as 'parent training'.

In order to intentionally change natural conversation habits of a person, it is demanded to concentrate efforts for a long time and always pay attention at every instant in daily life. This is never simple to a parent who has not been studied specialized language treatment.

Therefore, in order to correct conversation habits of parent suitably for the treatment of language delay of a child, there is demanded a system for monitoring conversations in daily life between the parent and the child and guiding the parent to rapidly correct the conversation habits based on the monitoring results.

SUMMARY OF THE INVENTION

The present disclosure is directed to providing a language delay treatment system configured to analyze a conversation pattern between a parent and a child and guides the parent to correct a conversation habit, and a control method for the same.

By using the above configuration, the language delay treatment system and the control method for the same according to the present disclosure may actively expand the language treatment effects for an infant, who is suffering from language delay, over the entire daily life.

In addition, by monitoring a conversation pattern between the parent and the child, a conversation habit which should be corrected may be rapidly recognized.

Moreover, by sending a correction guide message for the conversation habit which should be corrected, it is possible to support the parent to be efficiently trained against the language delay.

Further, it is possible to give a motive for preventing or early treating a language delay problem.

According to an aspect of the present disclosure, there is provided a control terminal, comprising: a data communication unit for receiving a first user voice by data communication with a first audio device and receiving a second user voice by data communication with a second audio device; a turn information generating unit for generating turn information, which is voice unit information, by using the first and second user voices; and a metalanguage processing unit for determining a conversation pattern of the first and second users by using the turn information, and outputting a reminder message corresponding to a reminder event to the first user when the conversation pattern corresponds to a preset reminder event occurrence condition.

The control terminal may further comprise a preprocessing unit for optionally processing the first and second user voices with respect to a voice range.

The turn information in the control terminal may include at least one of speaker identification information, time, accent, loudness and speed of a unit voice.

The turn information generating unit in the control terminal may determine speaker identification information of the turn information according to a ratio of the first user voice and the second user voice.

The turn information generating unit generating unit in the control terminal may generate the turn information when the first user voice or the second user voice is equal to or greater than a preset loudness.

The reminder event occurrence condition may include at least one of a case in which only a turn of the first user occurs during a preset time, a case in which only a turn of the second user occurs during a preset time, a case in which the turn of the first user occurs over a preset number before the turn of the second user ends, a case in which the turn of the first user continues over a preset time, and a case in which the turn of the first user is equal to or greater than a preset speed.

According to still another aspect of the present disclosure, there is provided a control method for a language delay treatment system, which includes a first audio device for receiving a voice of a first user, a second audio device for receiving a voice of a second user, and a control terminal, the control method comprising: receiving, by the control terminal, the first user voice by data communication with the first audio device; receiving, by the control terminal, the second user voice by data communication with the second audio device; generating, by the control terminal, turn information which is voice unit information by using the first and second user voices; determining, by the control terminal, a conversation pattern of the first and second users by using the turn information; and outputting, by the control terminal, a reminder message corresponding to a reminder event to the first user when the conversation pattern corresponds to a preset reminder event occurrence condition.

The control method for a language delay treatment system may further comprise: preprocessing for optionally processing the first and second user voices with respect to a voice range.

The turn information may include at least one of speaker identification information, time, accent, loudness and speed of a unit voice.

The generating of turn information may determine speaker identification information of the turn information according to a ratio of the first user voice and the second user voice.

The generating of turn information generates the turn information when the first user voice or the second user voice is equal to or greater than a preset loudness.

The reminder event occurrence condition includes at least one of a case in which only a turn of the first user occurs during a preset time, a case in which only a turn of the second user occurs during a preset time, a case in which the turn of the first user occurs over a preset number before the turn of the second user ends, a case in which the turn of the first user continues over a preset time, and a case in which the turn of the first user is equal to or greater than a preset speed.

BRIEF DESCRIPTION OF THE DRAWINGS

The above and other features and advantages will become more apparent to those of ordinary skill in the art by describing in detail exemplary embodiments with reference to the attached drawings, in which:

FIG. 8 is a diagram showing a reminder event occurrence condition according to an embodiment of the present disclosure;

FIG. 12 is a diagram showing a reminder message according to an embodiment of the present disclosure.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
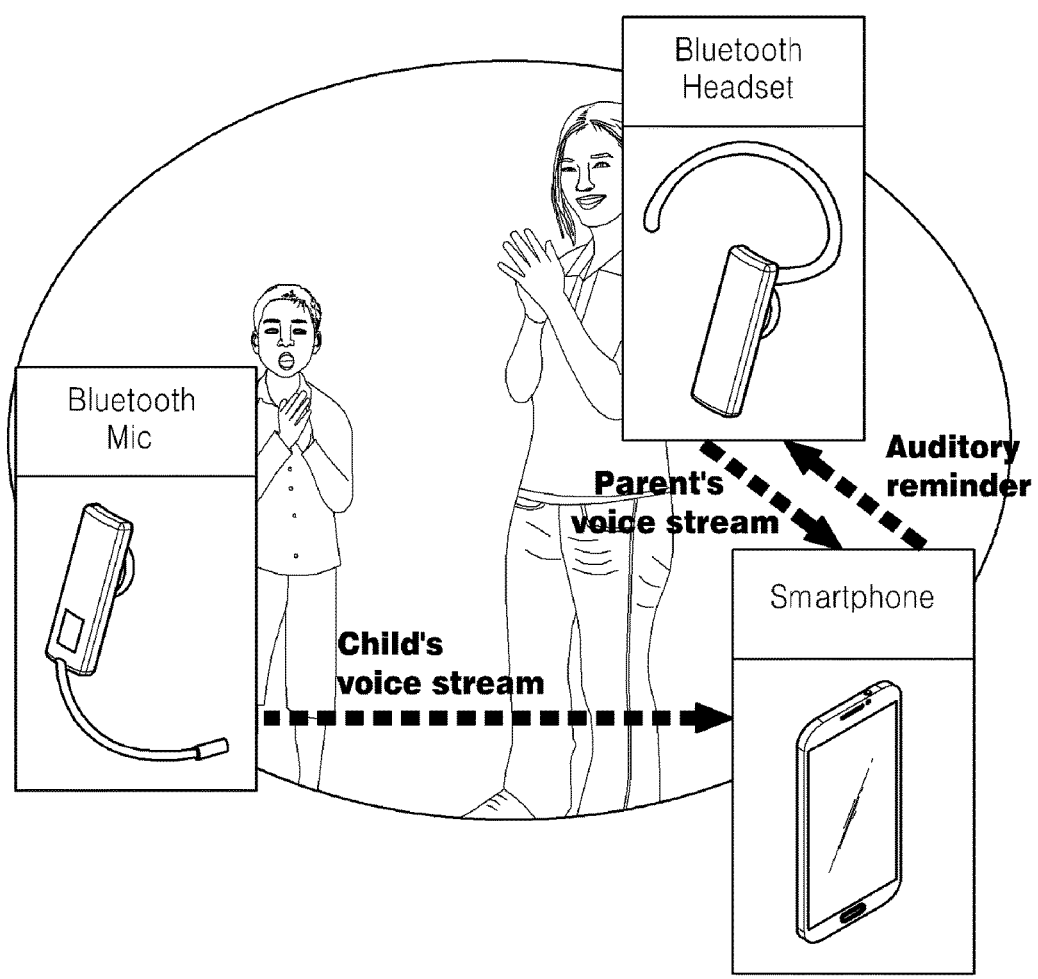
FIG. 1 shows a service environment of a language delay treatment system according to an embodiment of the present disclosure.

FIG. 1 shows a service environment of a language delay treatment system according to an embodiment of the present disclosure.

The language delay treatment system provides a conversation habit correction guide service to parent in real time.

The language delay treatment system receives a voice of a user (a parent or a child) through an audio device such as a Bluetooth headset or a microphone and sends the voice to a control terminal such as a smart phone. In addition, the control terminal operates the conversation habit correction guide service as a background service to continuously monitor conversations between the parent and the child without intentional intervention of the parent.

In addition, the language delay treatment system analyzes a time-based pattern of the conversations between the parent and the child in real time, and if a pattern not in accordance with recommended patterns treated by a speech therapist is found, the language delay treatment system automatically reminds the parent of it through voice guidance or the like.

Figure 2:
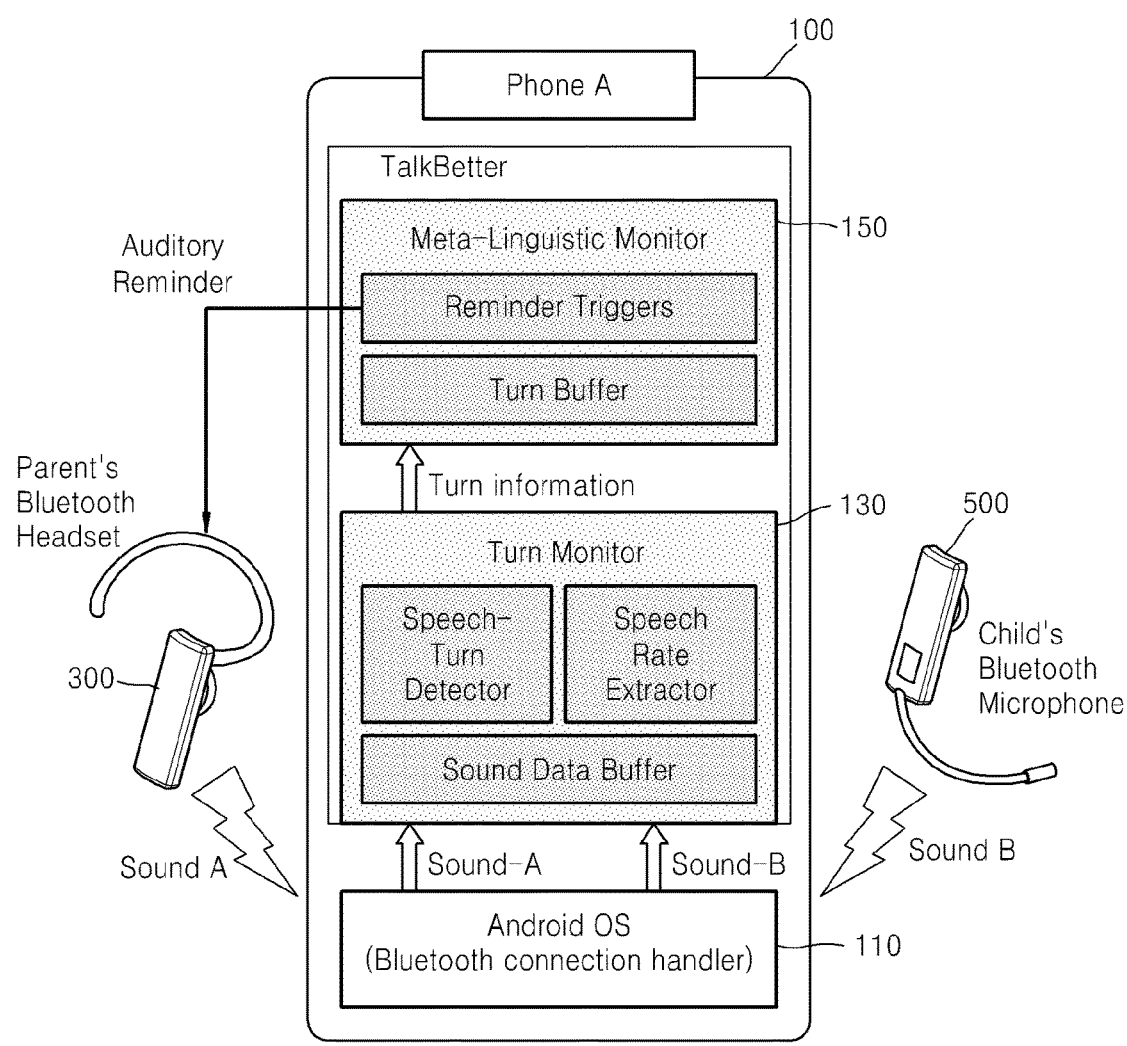
FIGS. 2 to 4 are diagrams showing the language delay treatment system according to an embodiment of the present disclosure.
Figure 3:
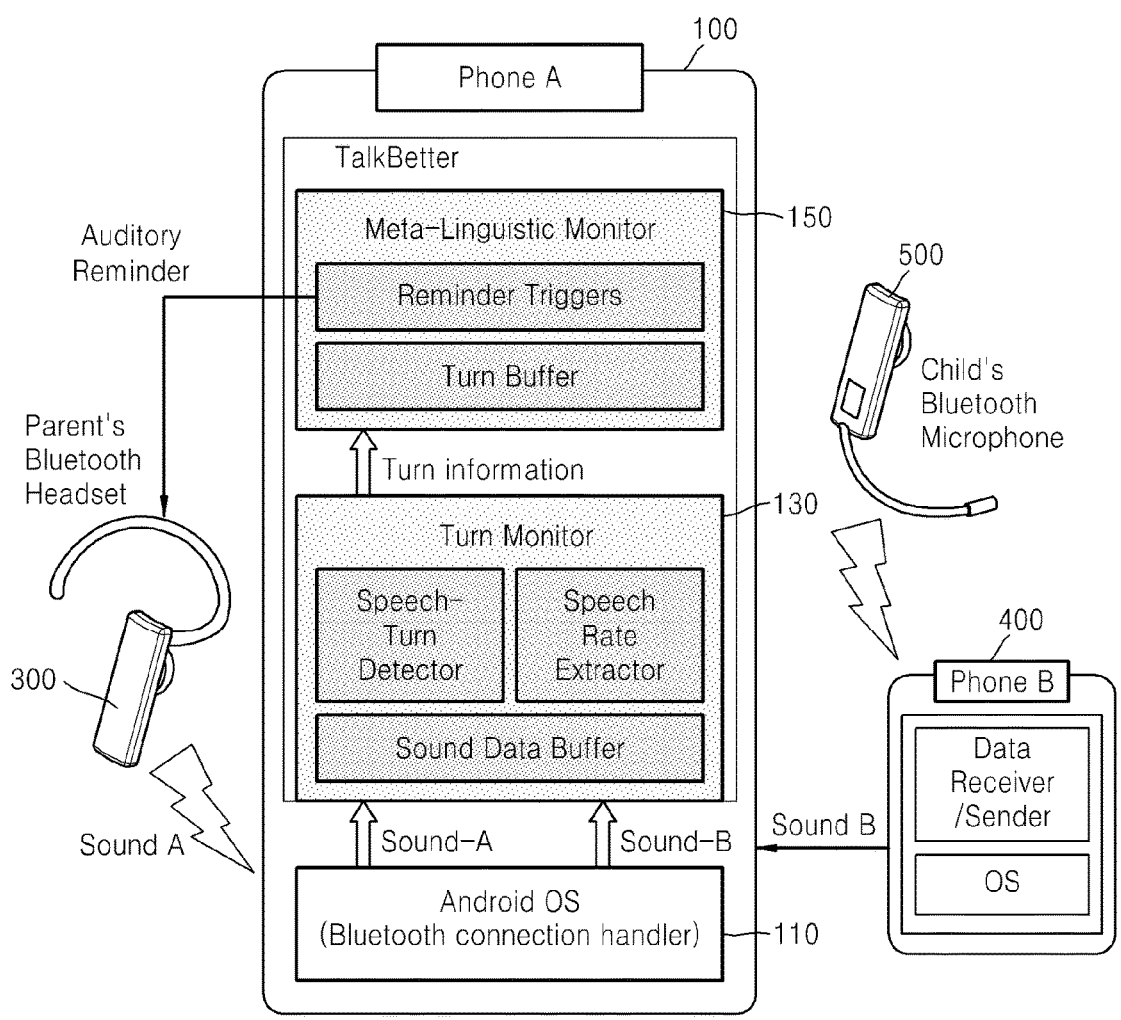
Figure 4:
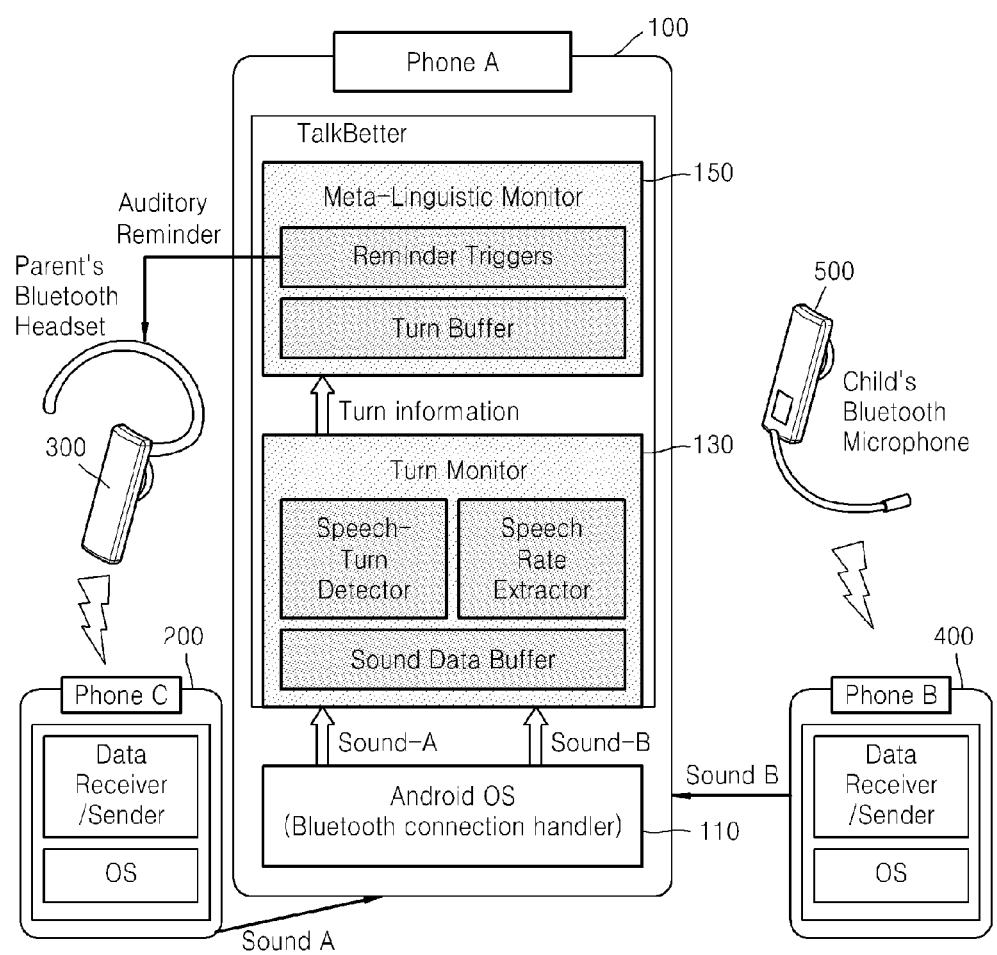

FIGS. 2 to 4 are diagrams showing the language delay treatment system according to an embodiment of the present disclosure.

First, FIG. 2 is a diagram showing a language delay treatment system according to a first embodiment of the present disclosure, and the language delay treatment system includes a control terminal 100, a first audio device 300 and a second audio device 500.

The first audio device 300 is configured to receive a voice of the parent, and for example, the first audio device 300 may be a Bluetooth headset. The parent wears the first audio device 300 and input their voice thereto.

The second audio device 500 is configured to receive a voice of the child, and for example, the second audio device 500 may be a Bluetooth microphone. The child wears the second audio device 500 and inputs a voice thereto.

The control terminal 100 includes a data communication unit 110, a turn information generating unit 130 and a metalanguage processing unit 150, and for example, the control terminal 100 may be a mobile terminal such as a smart phone, a tablet or a notebook.

The data communication unit 110 is configured to receive a parent voice by data communication with the first audio device 300, and to receive a child voice by data communication with the second audio device 500.

Even though it is depicted that the data communication unit 110 and the first and second audio devices 300, 500 make Bluetooth communication, the present disclosure is not limited thereto and may receive a user voice by means of various kinds of data communication such as IR communication, NFC, wire communication or the like.

The turn information generating unit 130 is configured to generate turn information, which is voice unit information, by using the input parent and child voices.

First, the turn represents a vocalization unit extracted from a successive voice stream of the parent and the child. In addition, the turn information includes speaker identification information, start time, duration time, voice accent, voice loudness, voice speed or the like of each turn.

Relations of the user voice stream and turn, and the turn information will be described later in detail with reference to FIG. 6.

In addition, the turn information generating unit 130 may determine speaker identification information of the turn information by comparing loudness of the input parent voice with loudness of the input child voice and finding relative voice loudness in comparison to surrounding noise loudness.

For example, if a ratio of parent voice loudness and child voice loudness in one turn is 8:2, the turn information generating unit 130 may determine that the corresponding turn belongs to a parent voice, namely, the speaker identification information of the turn is the parent.

In addition, the turn information generating unit 130 may extract acoustic meta information such as voice accent, voice loudness and voice speed by applying various acoustic signal processing logics.

Moreover, the turn information generating unit 130 may be configured to generate the corresponding turn information only when the parent voice or the child voice is equal to or greater than a preset loudness. This prevents turn information from being generated by surrounding noise.

The metalanguage processing unit 150 analyzes a conversation pattern between the parent and the child by using the turn information.

If the conversation pattern between the parent and the child corresponds to a preset reminder event occurrence condition, the metalanguage processing unit 150 outputs a reminder message corresponding to the reminder event to the parent.

In the present disclosure, the reminder event occurrence condition may include five cases as follows.

(R1) a case in which only a turn of the parent occurs during a preset time (R2) a case in which only a turn of the child occurs during a preset time (R3) a case in which the turn of the parent occurs over a preset number before the turn of the child ends (R4) a case in which the turn of the parent continues over a preset time (R5) a case in which the turn of the parent is equal to or greater than a preset speed The reminder event occurrence condition will be described later in detail with reference to FIGS. 7 and 8.

In addition, the metalanguage processing unit 150 may output the reminder message through the control terminal 100, and may send the reminder message to the first audio device 300 so that the first audio device 300 outputs the reminder message to the parent.

Even though it is depicted that the reminder message is output to the parent as a voice, the present disclosure may also output the reminder message on a screen by using a display of the control terminal 100 or the first audio device 300.

The reminder message will be described in detail later with reference to FIG. 12.

The control terminal 100 may further include a preprocessing unit (not shown) for optionally processing a voice of the parent and the child with respect to a voice range.

The sound input from the first audio device 300 and the second audio device 500 may include not only a user voice but also various surrounding noise. Therefore, a preprocessing technique for enhancing selectivity for a human voice range from the input sound is required.

The preprocessing unit (not shown) may perform the preprocessing work by using a band-pass filter turned suitable for a human voice spectrum band or a voice activity detection (VAD) technique.

In addition, as shown in the figures, the data communication unit 110 and the preprocessing unit (not shown) may operate on an operating system (OS) of the control terminal 100.

FIG. 3 is a diagram showing a language delay treatment system according to a second embodiment of the present disclosure, and FIG. 4 is a diagram showing a language delay treatment system according to a third embodiment of the present disclosure.

The language delay treatment system according to the second embodiment of the present disclosure further includes a second mobile terminal 400. The second mobile terminal 400 receives a child voice from the second audio device 500 and transmits the child voice to the control terminal 100.

The language delay treatment system according to the third embodiment of the present disclosure further includes a first mobile terminal 200 and a second mobile terminal 400. The first mobile terminal 200 receives a parent voice from the first audio device 300 and transmits the parent voice to the control terminal 100, and the second mobile terminal 400 receives a child voice from the second audio device 500 and transmits the child voice to the control terminal 100.

In addition, the first mobile terminal 400 and the second mobile terminal 400 may preprocess a voice of the parent or the child and transmit the preprocessed voice to the control terminal 100. By doing so, the workloads of the control terminal 100 may be reduced.

Figure 5:
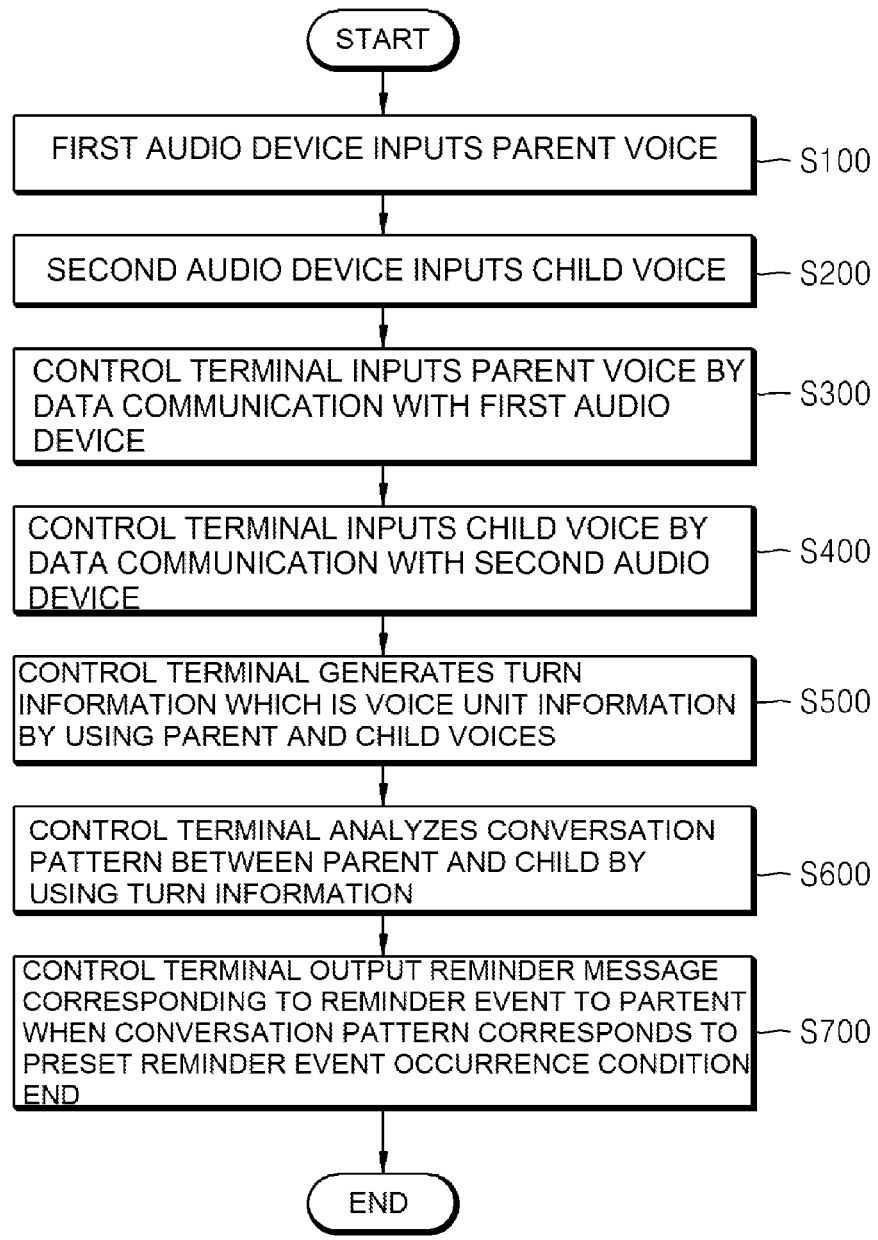
FIG. 5 is a flowchart illustrating a control method for the language delay treatment system according to an embodiment of the present disclosure.

FIG. 5 is a flowchart illustrating a control method for the language delay treatment system according to an embodiment of the present disclosure.

As shown in FIG. 5, the control method for the language delay treatment system includes receiving, by the first audio device 300, a parent voice (S100), receiving, by the second audio device 500, a child voice (S200), receiving, by the control terminal 100, the parent voice by data communication with the first audio device 300 (S300), receiving, by the control terminal 100, the child voice by data communication with the second audio device 500 (S400), generating, by the control terminal 100, turn information which is voice unit information by using the parent and child voice (S500), analyzing, by the control terminal 100, a conversation pattern between the parent and the child by using the turn information (S600), and outputting, by the control terminal 100, a reminder message corresponding to a reminder event to the parent when the conversation pattern corresponds to a preset reminder event occurrence condition (S700).

First, the first audio device 300 receives a parent voice (S100), and the second audio device 500 receives a child voice (S200). As described above, the first audio device 300 and the second audio device 500 are configured with a Bluetooth headset or a Bluetooth microphone to receive a voice of a user.

In addition, the data communication unit 110 of the control terminal 100 receives a parent voice by data communication with the first audio device 300 (S300), and receives a child voice by data communication with the second audio device 500 (S400).

Even though it is described in the specification that the data communication unit 110 and the first and second audio devices 300, 500 perform Bluetooth communication, the present disclosure is not limited thereto but may receive a user voice by means of various kinds of data communication such as IR communication, NFC, wire communication or the like.

In addition, the turn information generating unit 130 of the control terminal 100 generates turn information, which is voice unit information, by using the parent voice and the child voice (S500).

As described above, the turn represents a vocalization unit extracted from a successive voice stream of the parent and the child. In addition, the turn information includes speaker identification information, start time, duration time, voice accent, voice loudness, voice speed or the like of each turn.

Moreover, the turn information generating unit 130 may determine speaker identification information of the turn information by comparing loudness of the input parent voice with loudness of the input child voice and finding relative voice loudness in comparison to surrounding noise loudness.

In addition, the turn information generating unit 130 may extract acoustic meta information such as voice accent, voice loudness and voice speed by applying various acoustic signal processing logics.

Moreover, the turn information generating unit 130 may be configured to generate the corresponding turn information only when the parent voice or the child voice is equal to or greater than a preset loudness. This prevents turn information from being generated by surrounding noise.

In addition, the metalanguage processing unit 150 of the control terminal 100 analyzes a conversation pattern between the parent and the child by using the turn information (S600). Moreover, if the conversation pattern corresponds to a preset reminder event occurrence condition, the metalanguage processing unit 150 outputs a reminder message corresponding to the reminder event to the parent (S700).

The metalanguage processing unit 150 may output the reminder message through the control terminal 100, and may send the reminder message to the first audio device 300 so that the first audio device 300 outputs the reminder message to the parent.

In addition, even though it is described in the specification that the reminder message is output to the parent as a voice, the present disclosure may also output the reminder message on a screen by using a display of the control terminal 100 or the first audio device 300.

Moreover, the control method for the language delay treatment system may further include optionally processing a voice of the parent and the child with respect to a voice range, by means of a preprocessing unit (not shown) of the control terminal 100.

As described above, the sound input from the first audio device 300 and the second audio device 500 may include not only a user voice but also various surrounding noise. Therefore, a preprocessing technique for enhancing selectivity for a human voice range from the input sound is required.

The preprocessing unit (not shown) may perform the preprocessing work by using a band-pass filter turned suitable for a human voice spectrum band or a voice activity detection (VAD) technique.

Figure 6:
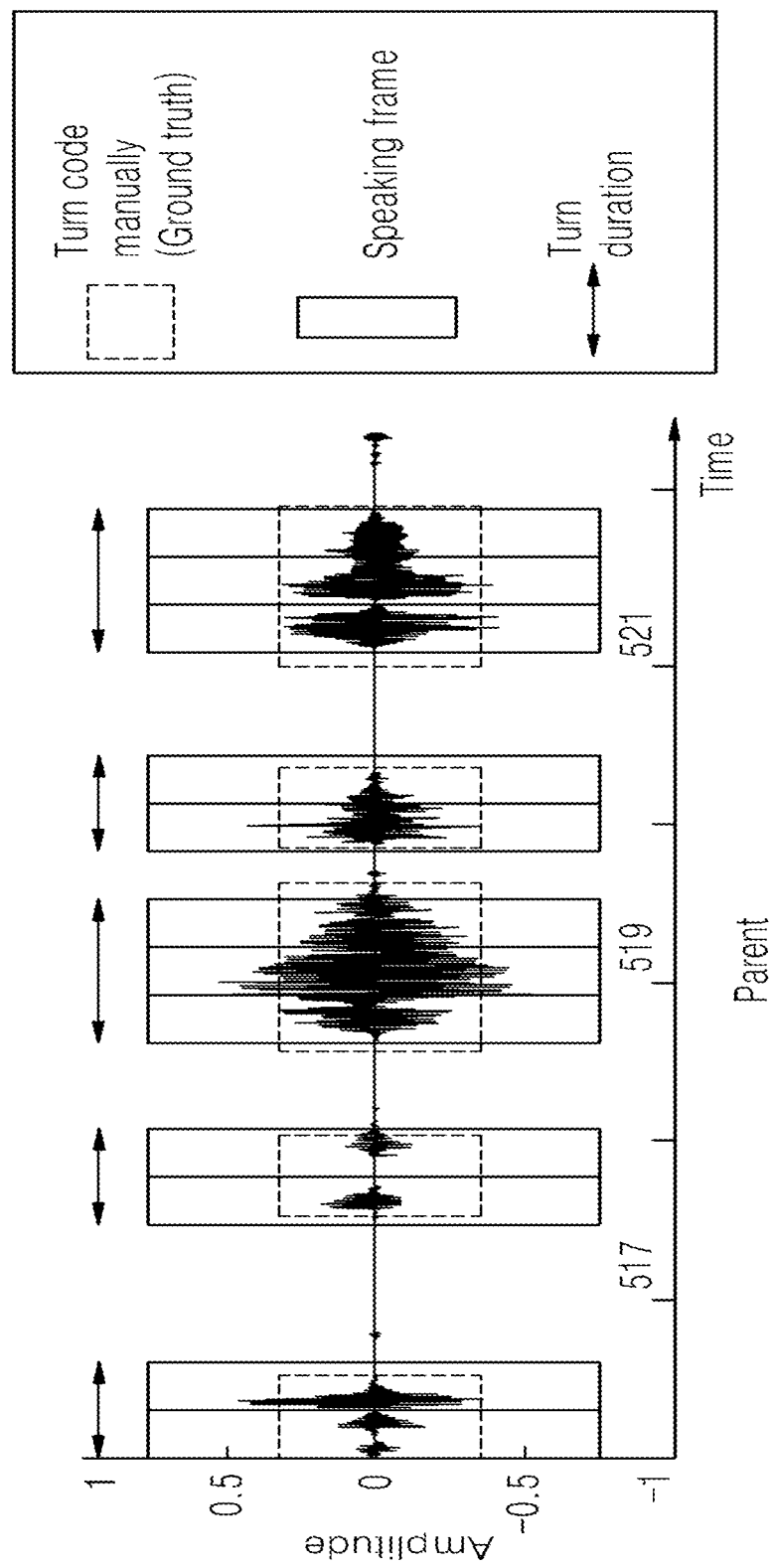
FIG. 6 describes relations of the user voice stream and turn, and the turn information.

FIG. 6 is a diagram showing user voice information and turn information according to an embodiment of the present disclosure.

FIG. 6 shows a voice stream of the parent and turn information of the corresponding voice stream.

First, the turn is obtained by extracting a vocalization region from a voice stream as a unit, and in FIG. 6, a turn is generated by extracting a vocalization region from the voice stream of the parent.

In addition, the turn information is voice stream information of the generated turn, and the turn information speaker identification information, start time, duration time, voice accent, voice loudness, voice speed or the like of the voice stream to which the corresponding turn belongs.

Therefore, the turn information generating unit 130 extracts a turn of a voice stream by using the corresponding voice stream and generates turn information which is voice stream information of the corresponding turn.

Figure 7:
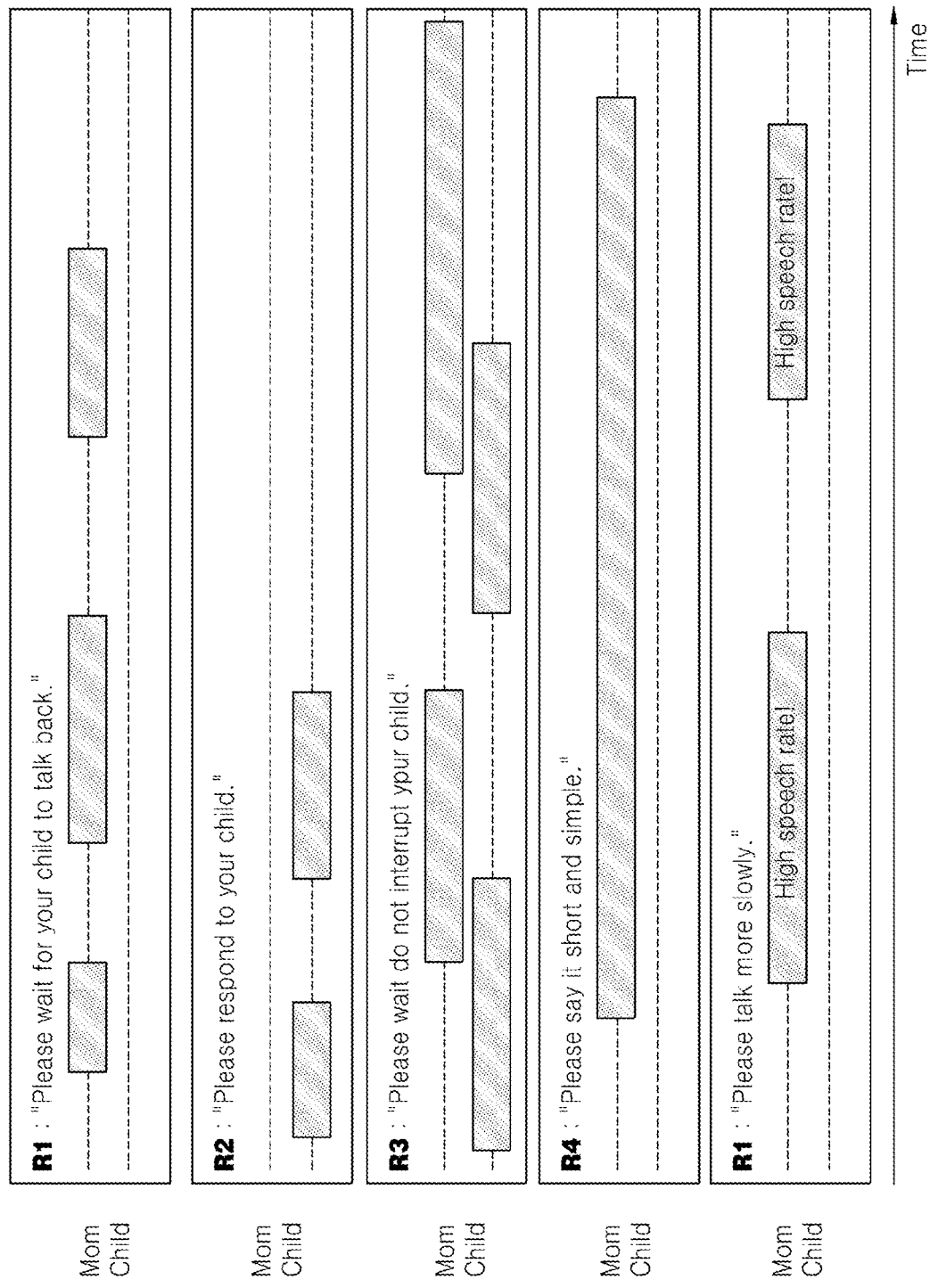
FIG. 7 is a diagram showing a reminder event occurrence condition of turn information according to an embodiment of the present disclosure.

FIG. 7 is a diagram showing a reminder event occurrence condition of turn information according to an embodiment of the present disclosure, and FIG. 8 is a diagram showing a reminder event occurrence condition according to an embodiment of the present disclosure.

As described above, the reminder event occurrence condition may include five cases.

First, there is a first reminder event (R1) occurrence condition in which only a turn of the parent occurs during a preset time. This condition means that the parent talks alone regardless of an answer of the child.

The first reminder event (R1) occurrence condition has a formula "R1 is triggered if a parent's turns repeat $N_{dominance}$ times in which pauses between adjacent turns are shorter than $T_{wait}$ AND no child's turn appears during these parent turns." Here, $N_{dominance}$ represents a repetition number of the preset parent turns, and $T_{wait}$ represents an interval time of the preset parent turns.

In addition, there is a second reminder event (R2) occurrence condition in which only a turn of the child occurs during a preset time. This condition means that the parent does not answer to the child's talk.

The second reminder event (R2) occurrence condition has a formula "R2 is triggered if the following condition repeats $N_{grace2}$ times: Given a child's turn, neither a parent's nor a child's turn follows within time duration $T_{neglect}$." Here, $N_{grace2}$ represents a repetition number of the preset child turns, and $T_{neglect}$ represents an interval time of the preset child turns.

In addition, there is a third reminder event (R3) occurrence condition in which the turn of the parent occurs over a preset number before the turn of the child ends. This condition means that the parent does not answer to the child's talk.

The third reminder event (R3) occurrence condition has a formula "R3 is triggered if a parent's turn begins before the child's turn ends for $N_{grace3}$ times." Here, $N_{grace3}$ represents a preset number of the parent's turns which have occurred before the child's turn ends.

In addition, there is a fourth reminder event (R4) occurrence condition in which the turn of the parent continues over a preset time. This condition means that the parent talks too long sentence to be understood by the child.

The fourth reminder event (R4) occurrence condition has a formula "R4 is triggered if the duration of a parent's turn is longer than $T_{long}$ AND no child turn follows within $T_{response4}$ after the parent's turn ends." Here, $T_{long}$ represents a duration time of the preset parent's turn, and $T_{response4}$ represents a generation time of the preset child's turn.

Finally, there is a fifth reminder event (R5) occurrence condition in which the turn of the parent is equal to or greater than a preset speed. This condition means that the parent talks too fast to be understood by the child.

The fifth reminder event (R5) occurrence condition has a formula "R5 is triggered if the estimated syllable rate of a parent's turn is higher than $R_{fast}$ AND no child turn follows within $T_{response5}$ after the parent's turn ends." Here, $R_{fast}$ represents a preset voice speed, and $T_{response5}$ represents a generation time of the preset child's turn.

Therefore, the metalanguage processing unit 150 determines by using the turn information whether the conversation pattern between the parent and the child corresponds to the reminder event occurrence condition mentioned above.

In addition, even though 5 reminder event occurrence conditions have been described in the specification, the present disclosure may also include various reminder event occurrence conditions which may be applied to treat language delay of a child.

Figure 9:
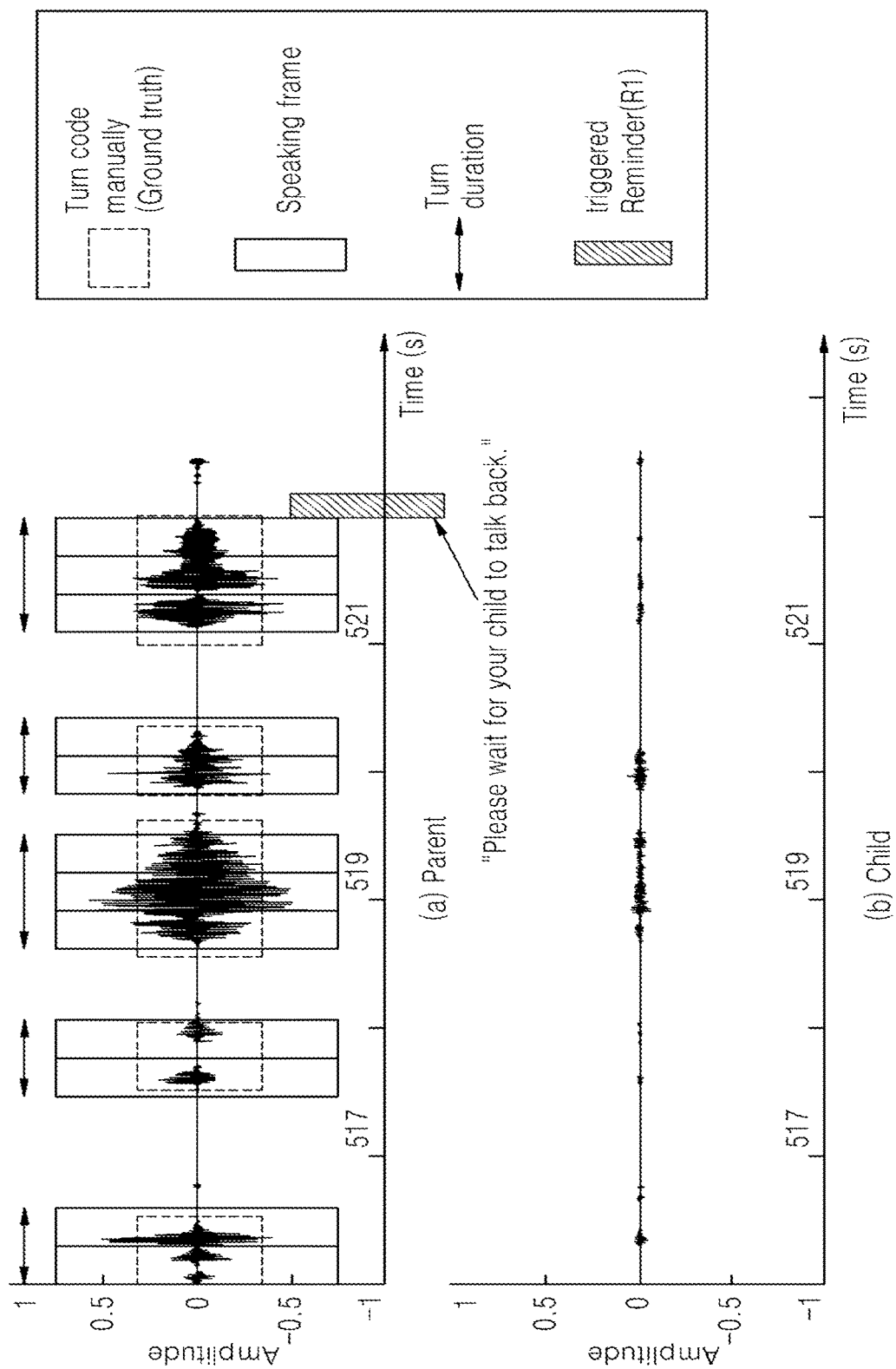
FIG. 9 is a diagram showing turn information of the first reminder event occurrence condition according to an embodiment of the present disclosure, in which only a turn of the parent occurs during a preset time.
Figure 10:
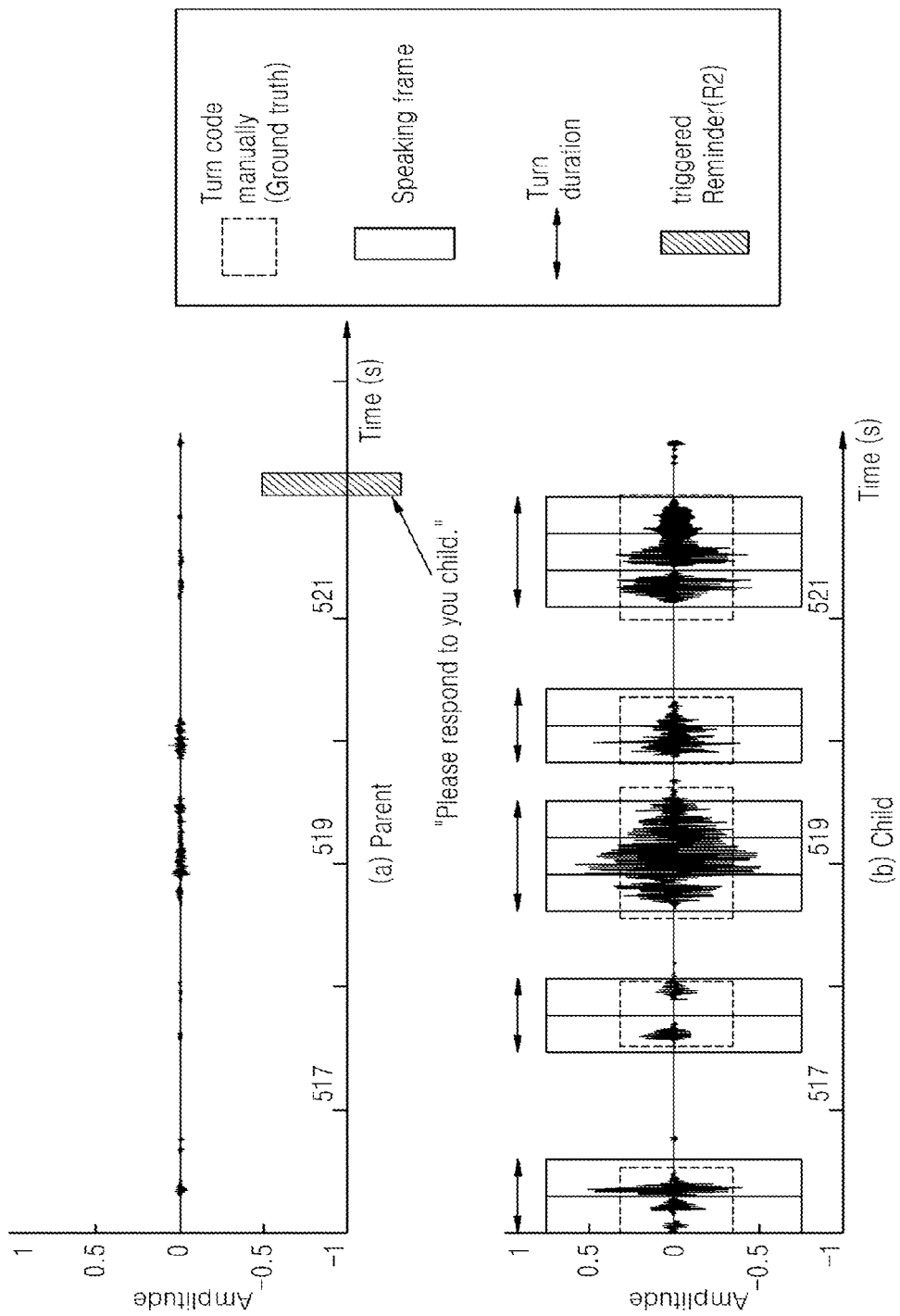
FIG. 10 is a diagram showing turn information of the second reminder event occurrence condition according to an embodiment of the present disclosure, in which only a turn of the child occurs during a preset time.
Figure 11:
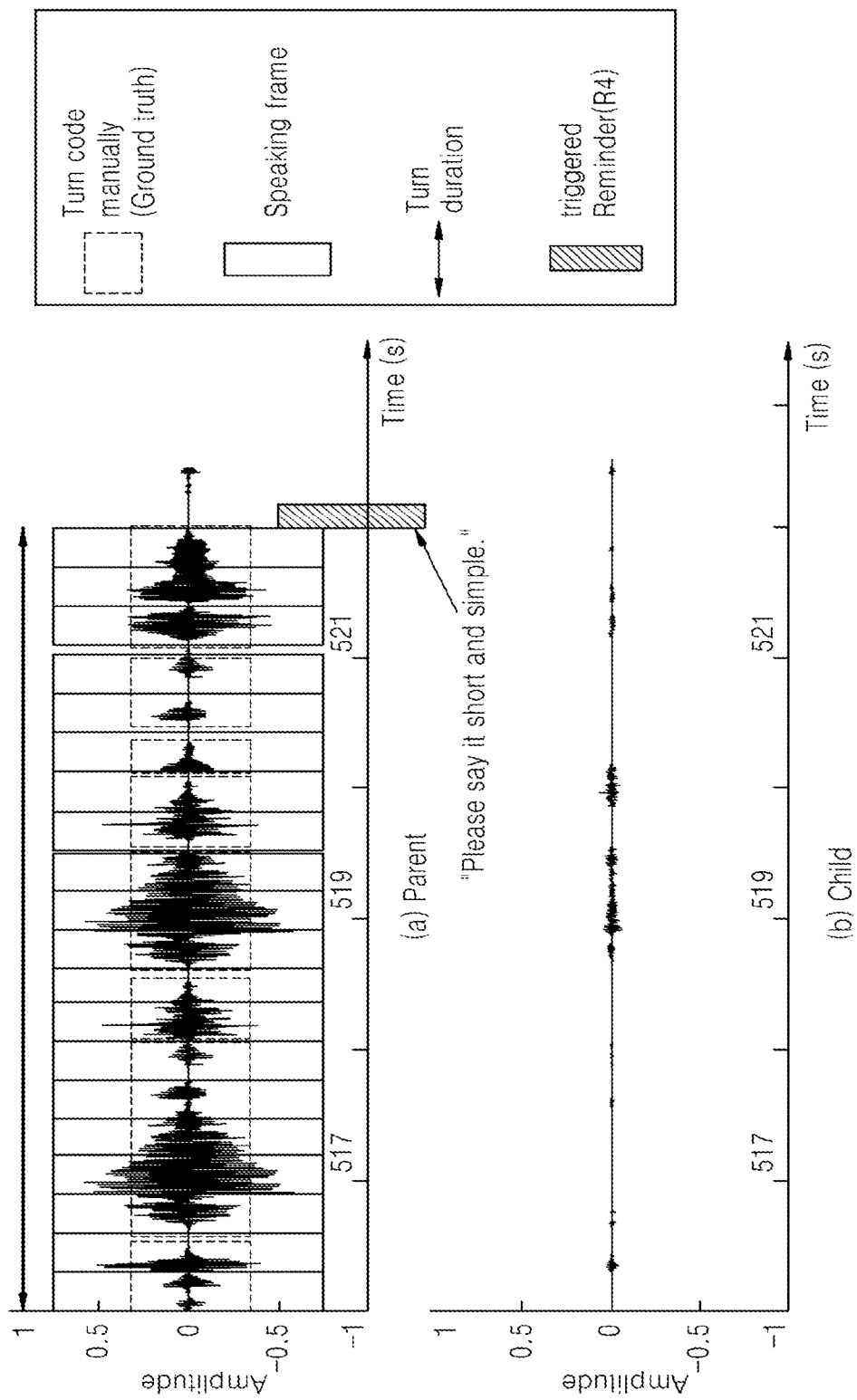
FIG. 11 is a diagram showing turn information of the fourth reminder event occurrence condition according to an embodiment of the present disclosure, in which the turn of the parent continues over a preset time.

FIGS. 9 to 11 show cases in which turn information of a parent and a child corresponds to the above reminder event occurrence conditions and therefore corresponding reminder events occur.

FIG. 9 is a diagram showing turn information of the first reminder event occurrence condition according to an embodiment of the present disclosure, in which only a turn of the parent occurs during a preset time.

FIG. 10 is a diagram showing turn information of the second reminder event occurrence condition according to an embodiment of the present disclosure, in which only a turn of the child occurs during a preset time.

FIG. 11 is a diagram showing turn information of the fourth reminder event occurrence condition according to an embodiment of the present disclosure, in which the turn of the parent continues over a preset time.

FIG. 12 is a diagram showing a reminder message according to an embodiment of the present disclosure.

As shown in FIG. 12, the first reminder (R1) may have a message "Please wait for your child to talk back.", the second reminder (R2) may have a message "Please respond to your child.", the third reminder (R3) may have a message "Please do not interrupt your child.", the fourth reminder (R4) may have a message "Please say it short and simple.", and the fifth reminder (R5) may have a message "Please talk more slowly."

Therefore, if a reminder event occurs, the metalanguage processing unit 150 may output the corresponding reminder message through the control terminal 100, or may send the reminder message to the first audio device 300 so that the first audio device 300 outputs it to the parent.

In addition, the metalanguage processing unit 150 may output the reminder message on a screen through a display of the control terminal 100 or the first audio device 300.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A control terminal comprising:
    a data communication unit for receiving a first user voice by data communication with a first audio device and receiving a second user voice by data communication with a second audio device;
    a turn information generating unit for generating turn information, which is voice unit information, by using the first and second user voices; and
    a meta-language processing unit for determining a conversation pattern of the first and second users by using the turn information, and outputting a reminder message corresponding to a reminder event to the first user when the conversation pattern corresponds to a preset reminder event occurrence condition,
    wherein the reminder event occurrence condition includes:
    a first reminder event occurrence condition, which is triggered when the first user's turn repeats $N_{dominance}$ times in which pauses between adjacent turns are shorter than $T_{wait}$ and no second user's turns appear during the first user's turns, wherein
        $N_{dominance}$ represents a preset repetition number of the first user's turns, and
        $T_{wait}$ represents a preset interval time of the first user's turns;
    a second reminder event occurrence condition, which is triggered when for the second user's given turn, neither the first nor the second user's turns appear within $T_{neglect}$, for $N_{grace2}$ times, wherein
        $N_{grace2}$ represents a preset repetition number of the second user's turns, and
        $T_{neglect}$ represents a preset interval time of the second user's turns;
    a third reminder event occurrence condition, which is triggered when the first user's turns begin before the second user's turns end, for $N_{grace3}$ times, wherein
        $N_{grace3}$ represents a preset number of the first user's turns which occur before the second user's turns end;
    a fourth reminder event occurrence condition, which is triggered when a duration time of the first user's turns is longer than $T_{long}$ and no second user's turns appear within $T_{response4}$ after the first user's turns ends, wherein
        $T_{long}$ represents a preset duration time of the first user's turns, and
        $T_{response4}$ represents a preset generation time of the second user's turns; and a fifth reminder event occurrence condition, which is triggered when a syllable rate of the first user's turns is higher than $R_{fast}$ and no second user's turns appear within $T_{response5}$ after the first user's turns end, wherein $R_{fast}$ represents a preset voice speed, and $T_{response5}$ represents a preset generation time of the second user's turns.

2. The control terminal of claim 1, further comprising a preprocessing unit for optionally processing the first and second user voices with respect to a voice range.

3. The control terminal of claim 1, wherein the turn information includes at least one of speaker identification information, time, accent, loudness and speed of a unit voice.

4. The control terminal of claim 3, wherein the turn information generating unit determines speaker identification information of the turn information according to a ratio of the first user voice and the second user voice.

5. The control terminal of claim 1, wherein the turn information generating unit generates the turn information when the first user voice or the second user voice is equal to or greater than a preset loudness.

6. The control terminal of claim 1, wherein the reminder event occurrence condition includes at least one of a case in which only a turn of the first user occurs during a preset time, a case in which only a turn of the second user occurs during a preset time, a case in which the turn of the first user occurs over a preset number before the turn of the second user ends, a case in which the turn of the first user continues over a preset time, and a case in which the turn of the first user is equal to or greater than a preset speed.

7. The control terminal of claim 2, wherein the turn information includes at least one of speaker identification information, time, accent, loudness and speed of a unit voice.

8. The control terminal of claim 7, wherein the turn information generating unit determines speaker identification information of the turn information according to a ratio of the first user voice and the second user voice.

9. The control terminal of claim 2, wherein the turn information generating unit generates the turn information when the first user voice or the second user voice is equal to or greater than a preset loudness.

10. The control terminal of claim 2, wherein the reminder event occurrence condition includes at least one of a case in which only a turn of the first user occurs during a preset time, a case in which only a turn of the second user occurs during a preset time, a case in which the turn of the first user occurs over a preset number before the turn of the second user ends, a case in which the turn of the first user continues over a preset time, and a case in which the turn of the first user is equal to or greater than a preset speed.

11. A control method for a language delay treatment system, which includes a first audio device for receiving a voice of a first user, a second audio device for receiving a voice of a second user, and a control terminal, the control method comprising:
receiving, by the control terminal, the first user voice by data communication with the first audio device;
receiving, by the control terminal, the second user voice by data communication with the second audio device;
generating, by the control terminal, turn information which is voice unit information by using the first and second user voices;
determining, by the control terminal, a conversation pattern of the first and second users by using the turn information; and outputting, by the control terminal, a reminder message corresponding to a reminder event to the first user when the conversation pattern corresponds to a preset reminder event occurrence condition, which includes:
a first reminder event occurrence condition, which is triggered when the first user's turn repeats $N_{dominance}$ times in which pauses between adjacent turns are shorter than $T_{wait}$ and no second user's turns appear during the first user's turns, wherein
$N_{dominance}$ represents a preset repetition number of the first user's turns, and
$T_{wait}$ represents a preset interval time of the first user's turns;
a second reminder event occurrence condition, which is triggered when for the second user's given turn, neither the first nor the second user's turns appear within $T_{neglect}$, for $N_{grace2}$ times, wherein
$N_{grace2}$ represents a preset repetition number of the second user's turns, and
$T_{neglect}$ represents a preset interval time of the second user's turns;
a third reminder event occurrence condition, which is triggered when the first user's turns begin before the second user's turns end, for $N_{grace3}$ times, wherein
$N_{grace3}$ represents a preset number of the first user's turns which occur before the second user's turns end;
a fourth reminder event occurrence condition, which is triggered when a duration time of the first user's turns is longer than $T_{long}$ and no second user's turns appear within $T_{response4}$ after the first user's turns ends, wherein
$T_{long}$ represents a preset duration time of the first user's turns, and
$T_{response4}$ represents a preset generation time of the second user's turns; and
a fifth reminder event occurrence condition, which is triggered when a syllable rate of the first user's turns is higher than $R_{fast}$ and no second user's turns appear within $T_{response5}$ after the first user's turns end, wherein
$R_{fast}$ represents a preset voice speed, and
$T_{response5}$ represents a preset generation time of the second user's turns;
wherein the meta-language processing unit does not output the reminder message to the second user.

12. The control method for a language delay treatment system of claim 11, further comprising:
preprocessing for optionally processing the first and second user voices with respect to a voice range.

13. The control method for a language delay treatment system of claim 11, wherein the turn information includes at least one of speaker identification information, time, accent, loudness and speed of a unit voice.

14. The control method for a language delay treatment system of claim 13, wherein the generating of turn information determines speaker identification information of the turn information according to a ratio of the first user voice and the second user voice.

15. The control method for a language delay treatment system of claim 11, wherein the generating of turn information generates the turn information when the first user voice or the second user voice is equal to or greater than a preset loudness.

16. The control method for a language delay treatment system of claim 11, wherein the reminder event occurrence condition includes at least one of a case in which only a turn of the first user occurs during a preset time, a case in which only a turn of the second user occurs during a preset time, a case in which the turn of the first user occurs over a preset number before the turn of the second user ends, a case in which the turn of the first user continues over a preset time, and a case in which the turn of the first user is equal to or greater than a preset speed.

17. The control method for a language delay treatment system of claim 12, wherein the turn information includes at least one of speaker identification information, time, accent, loudness and speed of a unit voice.

18. The control method for a language delay treatment system of claim 17, wherein the generating of turn information determines speaker identification information of the turn information according to a ratio of the first user voice and the second user voice.

19. The control method for a language delay treatment system of claim 12, wherein the generating of turn information generates the turn information when the first user voice or the second user voice is equal to or greater than a preset loudness.

20. The control method for a language delay treatment system of claim 12, wherein the reminder event occurrence condition includes at least one of a case in which only a turn of the first user occurs during a preset time, a case in which only a turn of the second user occurs during a preset time, a case in which the turn of the first user occurs over a preset number before the turn of the second user ends, a case in which the turn of the first user continues over a preset time, and a case in which the turn of the first user is equal to or greater than a preset speed.

21. A control terminal comprising:
a data communication unit for receiving a first user voice by data communication with a first audio device and receiving a second user voice by data communication with a second audio device;
a turn information generating unit for generating turn information, which is voice unit information, by using the first and second user voices; and
a meta-language processing unit for determining a conversation pattern of the first and second users by using the turn information, and outputting a reminder message corresponding to a reminder event to the first user when the conversation pattern corresponds to a preset reminder event occurrence condition, wherein the meta-language processing unit comprises a turn buffer and a reminder message trigger, which is activated upon a match between the conversation pattern stored in the buffer corresponds to the preset reminder event occurrence condition, and wherein the metalanguage processing unit does not output the reminder message to the second user;
wherein the reminder event occurrence condition includes:
a first reminder event occurrence condition, which is triggered when the first user's turn repeats $N_{dominance}$ times in which pauses between adjacent turns are shorter than $T_{wait}$ and no second user's turns appear during the first user's turns, wherein
$N_{dominance}$ represents a preset repetition number of the first user's turns, and
$T_{wait}$ represents a preset interval time of the first user's turns;
a second reminder event occurrence condition, which is triggered when for the second user's given turn, neither the first nor the second user's turns appear within $T_{neglect}$, for $N_{grace2}$ times, wherein
$N_{grace2}$ represents a preset repetition number of the second user's turns, and
$T_{neglect}$ represents a preset interval time of the second user's turns;
a third reminder event occurrence condition, which is triggered when the first user's turns begin before the second user's turns end, for $N_{grace3}$ times, wherein
$N_{grace3}$ represents a preset number of the first user's turns which occur before the second user's turns end;
a fourth reminder event occurrence condition, which is triggered when a duration time of the first user's turns is longer than $T_{long}$ and no second user's turns appear within $T_{response4}$ after the first user's turns ends, wherein
$T_{long}$ represents a preset duration time of the first user's turns, and
$T_{response4}$ represents a preset generation time of the second user's turns; and
a fifth reminder event occurrence condition, which is triggered when a syllable rate of the first user's turns is higher than $R_{fast}$ and no second user's turns appear within $T_{response5}$ after the first user's turns end, wherein
$R_{fast}$ represents a preset voice speed, and
$T_{response5}$ represents a preset generation time of the second user's turns.

* * * * *